US006206393B1

(12) United States Patent
Mascari et al.

(10) Patent No.: US 6,206,393 B1
(45) **Date of Patent: *Mar. 27, 2001**

(54) CONSTANT CENTER OF GRAVITY TILT SEAT OF A WHEELCHAIR

(75) Inventors: Nicolas A. Mascari, Newburgh Heights; Carl M. Juchem, Elyria, both of OH (US)

(73) Assignee: Invacare Corporation, Elyria, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/408,906

(22) Filed: Sep. 29, 1999

Related U.S. Application Data

(63) Continuation-in-part of application No. 09/188,851, filed on Nov. 9, 1998, now Pat. No. 6,126,186.

(51) Int. Cl.[7] .......................................................... B62M 1/00

(52) U.S. Cl. ........................................ 280/220; 280/250.1

(58) Field of Search ................................ 280/250.1, 650, 280/220, 230; 180/907; 297/325, 329

(56) References Cited

U.S. PATENT DOCUMENTS

| | | | | |
|---|---|---|---|---|
| 137,091 | * | 3/1873 | Parker | 248/395 |
| 160,624 | * | 3/1875 | Spencer | 248/395 |
| 1,438,667 | | 12/1922 | Schops . | |
| 1,970,577 | * | 8/1934 | Schauss | 297/329 |
| 3,901,527 | * | 8/1975 | Danzinger et al. | 280/638 |
| 4,383,714 | * | 5/1983 | Ishida | 297/325 |
| 4,759,561 | | 7/1988 | Janssen . | |
| 4,842,232 | | 6/1989 | Pipon et al. . | |
| 4,893,827 | | 1/1990 | Gay et al. . | |
| 4,957,302 | * | 9/1990 | Maxwell | 280/32.6 |
| 4,966,379 | | 10/1990 | Mulholland . | |
| 5,044,647 | | 9/1991 | Patterson . | |
| 5,137,295 | * | 8/1992 | Peek | 280/304.1 |
| 5,154,438 | | 10/1992 | Barclay . | |
| 5,294,141 | * | 3/1994 | Mentessi et al. | 280/250.1 |
| 5,297,021 | | 3/1994 | Koerlin et al. . | |
| 5,333,887 | * | 8/1994 | Luther | 280/250.1 |
| 5,458,349 | * | 10/1995 | Mung Tung | 280/250.1 |
| 5,624,159 | * | 4/1997 | Celoni et al. | 297/325 |
| 5,772,226 | * | 6/1998 | Bobichon | 280/250.1 |
| 5,785,384 | | 7/1998 | Sagstuen . | |
| 5,797,252 | * | 8/1998 | Goman | 56/17.2 |
| 5,884,928 | * | 3/1999 | Papac | 280/250.1 |
| 5,967,609 | * | 10/1999 | Potter | 297/325 |
| 6,012,774 | * | 1/2000 | Potter | 297/325 |
| 6,050,642 | * | 4/2000 | Erb | 297/322 |
| 6,056,363 | * | 5/2000 | Maddox | 297/325 |

FOREIGN PATENT DOCUMENTS

| | | | | |
|---|---|---|---|---|
| 0 405 542 | | 1/1991 | (DE) . | |
| 0405542 | * | 1/1991 | (EP) | 280/250.1 |
| 504239 | | 5/1939 | (GB) . | |
| 509033 | | 8/1939 | (GB) . | |

* cited by examiner

*Primary Examiner*—J. J. Swann
*Assistant Examiner*—Michael Cuff
(74) *Attorney, Agent, or Firm*—Hudak & Shunk Co., L.P.A.

(57) ABSTRACT

A tilt seat of a wheelchair is operatively connected to a wheel-chair frame through an archial support member and through a gear rack such that as the seat is tilted, the center of gravity of a person seated in the wheelchair is substantially maintained. A bracket which slides along the gear rack can be stopped at or released at any desired seat tilt inclination. The wheelchair can also contain a reclinable seat back member, and marking elements, which show the tilt angle of the seat.

23 Claims, 8 Drawing Sheets

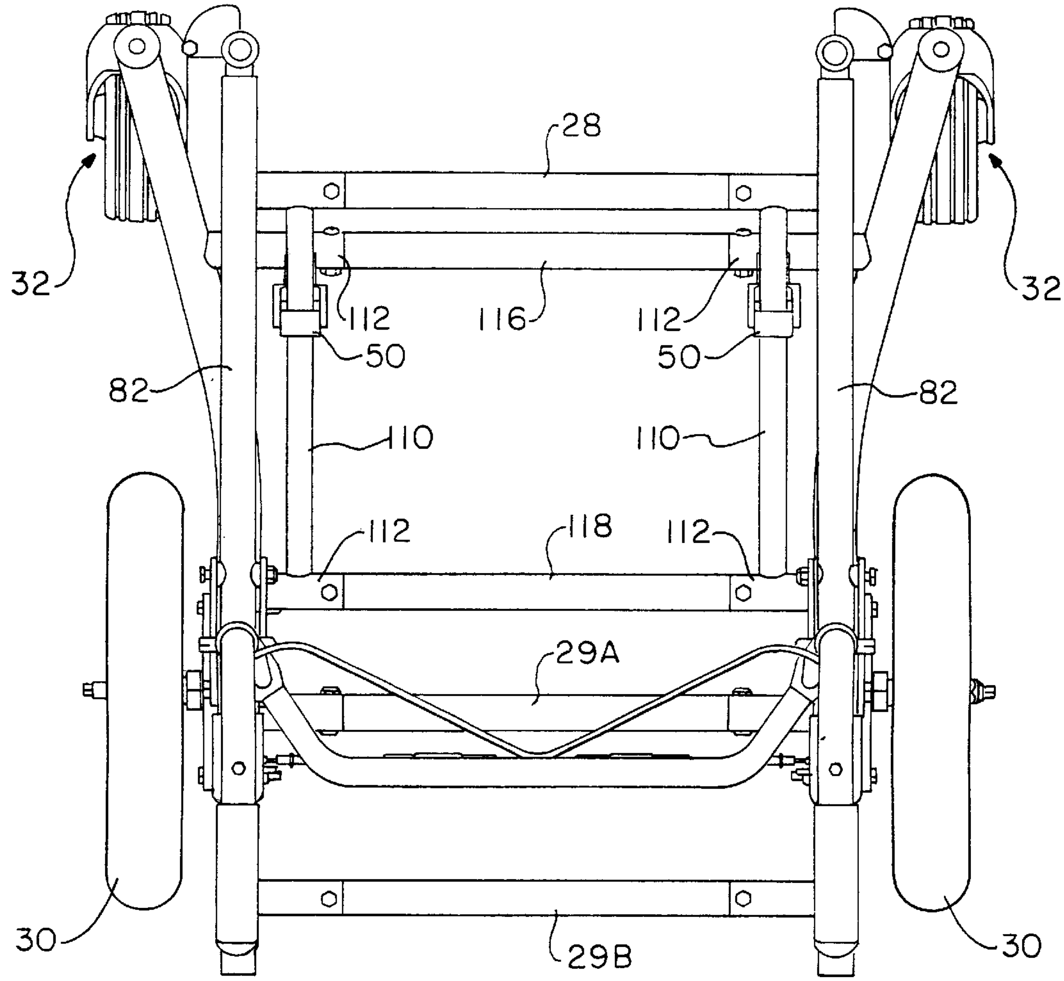
FIG.-4
FIG.-6
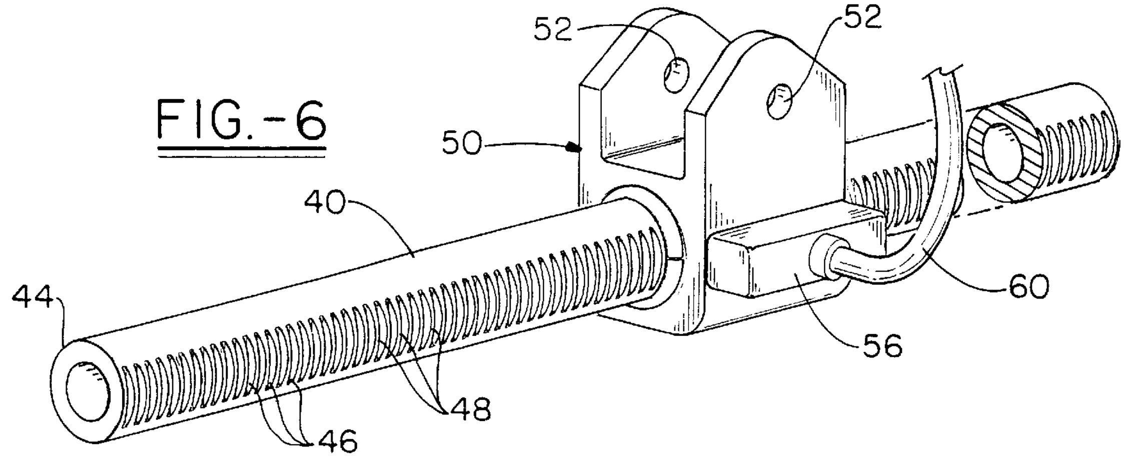

CONSTANT CENTER OF GRAVITY TILT SEAT OF A WHEELCHAIR

CROSS REFERENCE

This application is a continuation in part of U.S. Ser. No. 09/188,851 filed Nov. 9, 1998, now U.S. Pat. No. 6/126,186, for a CONSTANT CENTER OF GRAVITY TILT SEAT OF A WHEELCHAIR.

FIELD OF INVENTION

The present invention relates to a wheelchair having a tiltable seat containing a reclinable back member and a bottom member which seat is tilted as an integral unit while maintaining the center of gravity of a person seated therein. The wheelchair also has marking elements, which show the tilt angle of the seat.

BACKGROUND OF THE INVENTION

Heretofore, wheelchairs have existed wherein the chair or seat portion thereof was rockable about a common axis, or tilted about the rear apex of the seat, or which was pivotally connected to side members of a chair at a plurality of points to allow tilting thereof.

For example, U.S. Pat. No. 4,893,827 relates to a chair for use by an incapacitated person having a wheeled frame which carries a body support assembly composed of a seat, a back, and a foot rest. The back is angularly adjustable relative to the seat and the footrest is angularly adjustable relative to the seat. The body support assembly is rockable as a unit relative to the frame to enable the entire assembly to occupy any one of a number of tilted positions. The body support assembly may be removed as a unit from the frame for use as a car seat or the like.

U.S. Pat. No. 5,785,384 relates to a device for an adjustable chair where the back of the chair at a first mounting site on each side thereof is pivotally connected to respective side members of the chair and at a second mounting site forms a hinged connection with a rear part of the chair set frame, where the chair seat frame at a front mounting site on each side thereof is slidably connected to a respective side member along a front guide which forms a part of the side member. The first mounting site on the chair back is designed to slide along a rear, forward and downward inclining guide in the side member and the seat frame has on each side a rear mounting site between said front mounting site and said second mounting site for the chair back, said rear mounting site forming a slidable connection with a guide in each respective side member, which is located between the front and rear guides when seen in the longitudinal direction of the side member which is either horizontal or inclines slightly forward and upward.

U.S. Pat. No. 5,044,647 relates to a kit or assembly which can be used in the manufacture of a new wheelchair or to retrofit an existing wheelchair. The basic wheelchair structure includes a base portion having a pair of cross members mounted in the rear half of the upper portion of the wheelchair base structure. A pair of parallel guide rails are mounted between the cross members with a seat support bar attached to a pair of pillow blocks mounted on the guide rails. A linear actuator is centrally positioned within the wheelchair base structure to longitudinally move the seat support bar forwardly or rearwardly within the wheelbase of the wheelchair. A rear edge of a wheelchair seat unit is pivotally attached to the upper surface of the seat support bar. Cam plates, each having a curved cam slot, are provided on each side of the seat unit with the cam slots engaging cam followers mounted on a pair of stanchions provided on each side of the rear portion of the base structure. A control switch causes the linear actuator to move the seat support bar in a forward or rearward direction which causes the seat unit to move causing the cam follower pins positioned within the cam slots to tilt or angularly move the seat unit to a maximum reclined position of 60 degrees. The entire seat unit is moved forward a predetermined distance to obtain the desired degree of tilt and to maintain the center of gravity substantially centered within the base structure to maintain the balance and stability of the wheelchair and the safety of the patient.

SUMMARY OF INVENTION

A tiltable seat of a wheelchair has a back member and a bottom member with the bottom member being supported by an archial support member which slides or rolls over a support arm which is connected to the frame of the wheelchair. The seat, generally at the junction of the back member and the bottom member, is also slidably attached through a link and a bracket, having a pivot pin, to a gear rack which in turn is connected to the frame. The radius of curvature of the archial support member is desirably such that the end point of the radius generally coincides with the center of gravity of a hypothetical or composite person seated within the chair, and the angle of the gear rack is generally such that it approximates the arc of the bracket pivot pin about the center of gravity location if the seat were not connected to the gear rack. Through the use of a spring loaded hand grip and pull cable, the seat can be inclined to any desired tilt position and maintained there until the hand grip is subsequently released and the seat moved to another position. The wheelchair can also have marking elements which show the tilt angle of the seat, and also a reclinable back seat member.

BRIEF DESCRIPTION OF THE DRAWINGS

FIG. 4 is a top plan view taken in line 4—4 of FIG. 2 showing the wheelchair frame assembly, the archial support member, cross frame members, and the like.

FIG. 6 is a perspective view of the gear rack.

DETAILED DESCRIPTION OF THE PREFERRED EMBODIMENT

Figure 1:
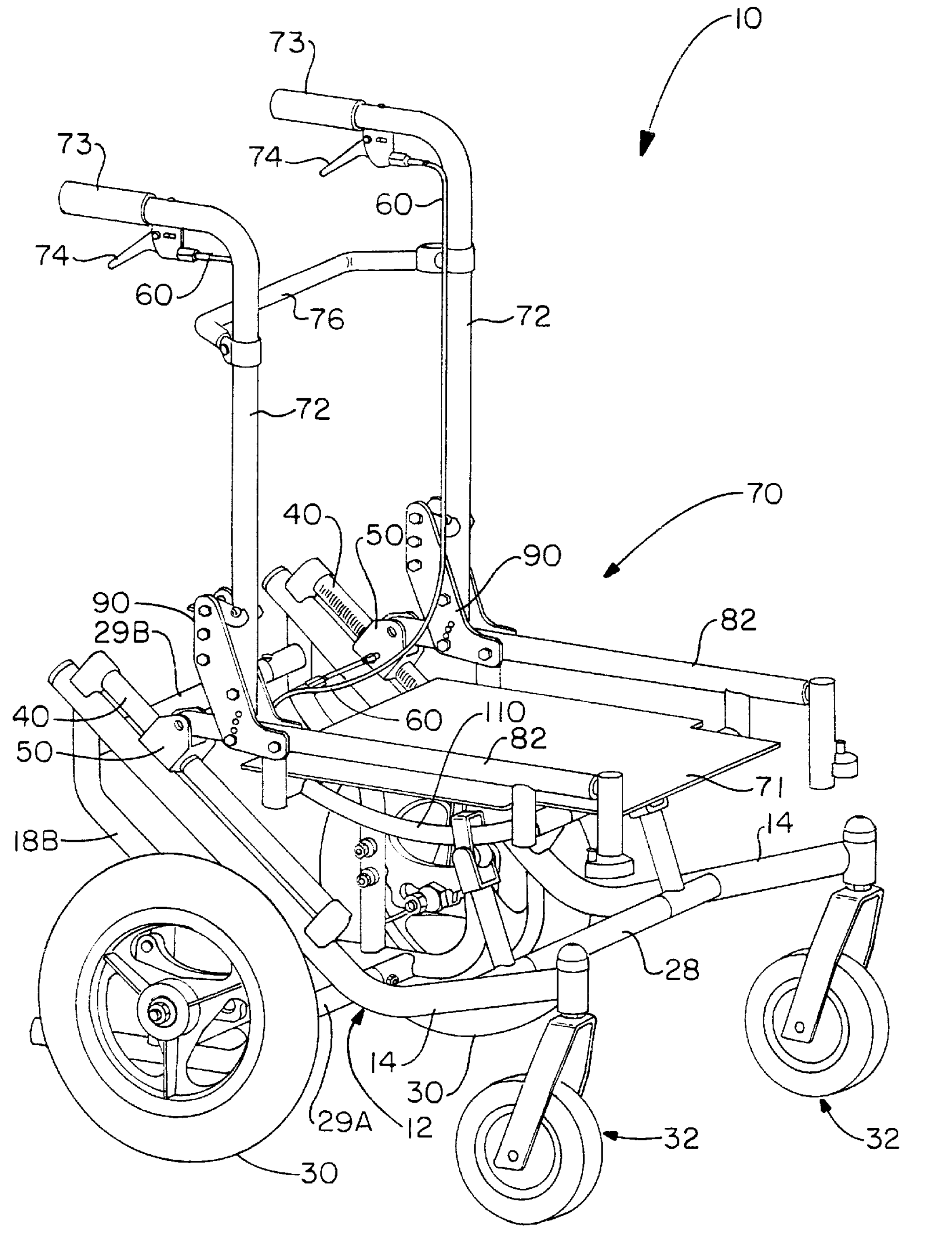
FIG. 1 is a perspective view of a wheelchair containing a tiltable seat according to the present invention.

A tiltable seat according to the present invention can be utilized on any conventional or typical wheelchair such as a powered wheelchair but desirably is utilized in association with a manual wheelchair. Wheelchair 10 contains mainframe 12 which has a front portion 14 and a rear portion 16 upwardly inclined at a predetermined angle with respect to the horizontal. The front end of frame front portion 14 contains a pivotal caster assembly 32 so that wheelchair 10 can be readily pivoted and turned in any desirable direction. Rear frame portion 16 contains a front leg 18A and a rear leg 18B depending therefrom which each containing a plurality of apertures 22 so that wheel 30 can be attached thereto at any desirable height through the utilization of a suitable or conventional wheel attachment structure. Such structure, which can be a bracket, can contain a plurality of slots or recesses so that the wheel axle can be located at any horizontal position. Connected to front frame portion 14 is support arm or clevis 24, which at the upper end thereof can have any convenient element such as roller 26 to allow a seat support member to slide or travel there over while being supported.

While various components will be shown by the drawings as being located on the right-hand side or left-hand side of the wheelchair, it is to be understood that such components exist on both sides of the chair and are very similar, and usually identical.

Gear rack 40 is connected to rear portion 16 of the frame through any suitable fastener 42 such as a cap screw. The gear rack can generally be of any shape or configuration such as a rectangle, a flange, a channel, or an annular tube 44 having along one side thereof recesses 46 with teeth 48 located there between. The recesses and teeth as shown in FIG. 6, generally extend along the entire length of the gear rack. Slidably engaging gear rack 40 is bracket 50 which generally can be of any size or shape and has an aperture 52 for receiving bracket pin 54 which pivotally receives a seat extension link discussed herein below in greater detail. Slidable bracket 50 can be operated manually as shown or by power (not shown). When operated manually, gear rack bracket 50 also receives pull cable 60 which is connected at the other end to a handgrip. The pull cable is received by spring loaded housing 56 of the gear rack bracket so that a projection, not shown, is always pressed or forced into a recess 46 of the gear rack thereby maintaining bracket 50 in a set or fixed position.

Seat 70 of the wheelchair contains back member 72 and bottom member 82 which constitutes a frame for the seat and exist on each lateral side of the seat as shown in FIG. 1. Back member 72 can be a metal tube or any other suitable article containing a handle 73 for gripping by an individual as well as pull cable release grip 74. Application of an upward pressure to the release grip or a squeezing pressure thereto by an individual causes pull cable 60 to be pulled upwardly along the back member and at its other end pulls the projection out of gear rack recess 46 so that the gear rack bracket can then be manually slid upwardly or downwardly and repositioned in another recess upon release of grip 74. When operated by power, not shown, bracket 50 can be moved in a number of different ways such as by a hydraulic piston connected to the frame, or by gear rack 40 being a worm gear meshing with teeth within the bracket. The back member also contains a transverse tilt bar 76, which in addition to handle 72, can be grasped by an individual to either push a manual wheelchair or to cause the seat to be manually tilted backward or forward. The height of the tilt bar can be adjusted by positioning the same in any of a plurality of apertures 77 which extend along the length of the back member. Located at a lower portion of back member 72 is seat back pin 78 which in part connects seat back 72 to connection plate 90. Typically, at the bottom end of the seat back, hinge pin 79 pivotally connects the seat back member to connection plate 90.

Rear portion 16 of frame 12 optionally can contain marking elements 17, which correspond to the degree that seat 70 is tiltable, as in a forward or backward direction. The seat may be tilted in a range generally of from about 10 degrees forward to about 45 degrees rearward. Markings 17 can be in the form of a decal, etching, scoring, or any suitable graduation marks or such. The markings 17 are capable of being lined up with a suitable marking point 19 located on gear rack bracket 50. Marking point 19 can also be a decal, etching, scoring, or other suitable locating element.

Marking point 19 in association with markings 17 readily allow the seat to be set at a desirable degree of tilt such as that recommended by physical therapist or other medical person. This ability imparts several advantages to a patient, such as ease of breathing, relief of pressure, improved ability to swallow, and improved posture.

Seat bottom member 82 can be a metal tubular seat frame member generally located on the lateral sides of the seat and contain various fittings and the like upon which a seat, a seat cushion, and the like can be placed. At the back end of bottom members 82 are generally located two bolts, i.e., front bolt 84 and rear bolt 86, which through corresponding apertures of the bottom member secure connection plate 90 to the bottom member.

Connection plate 90 serves to fixedly secure seat back member 72 to seat bottom member 82 as an integral unit such as at an angle of 90 degrees with respect to each other. Moreover, connection plate 90 permits back member 72 to be fixedly secured to the bottom member at a number of recline positions other than 90 degrees, for example, up to a reclining angle of about 30 degrees at generally 10 degree increments. This is accomplished through the utilization of apertures 98A, 98B, and 98C. Thus, in lieu of utilizing seat bottom bolt 86 in the position indicated in FIG. 2, the bolt can be inserted in aperture 98C to recline the back an additional 10 degrees, i.e., a 100 degree angle with respect to seat bottom member 82. Similarly, angles of an additional 20 degrees or 30 degrees can be obtained by utilizing aperture 98B or 98A, respectively, to achieve an overall angle of 110 and 110 degrees respectively with regard to the seat bottom member.

Figure 2:
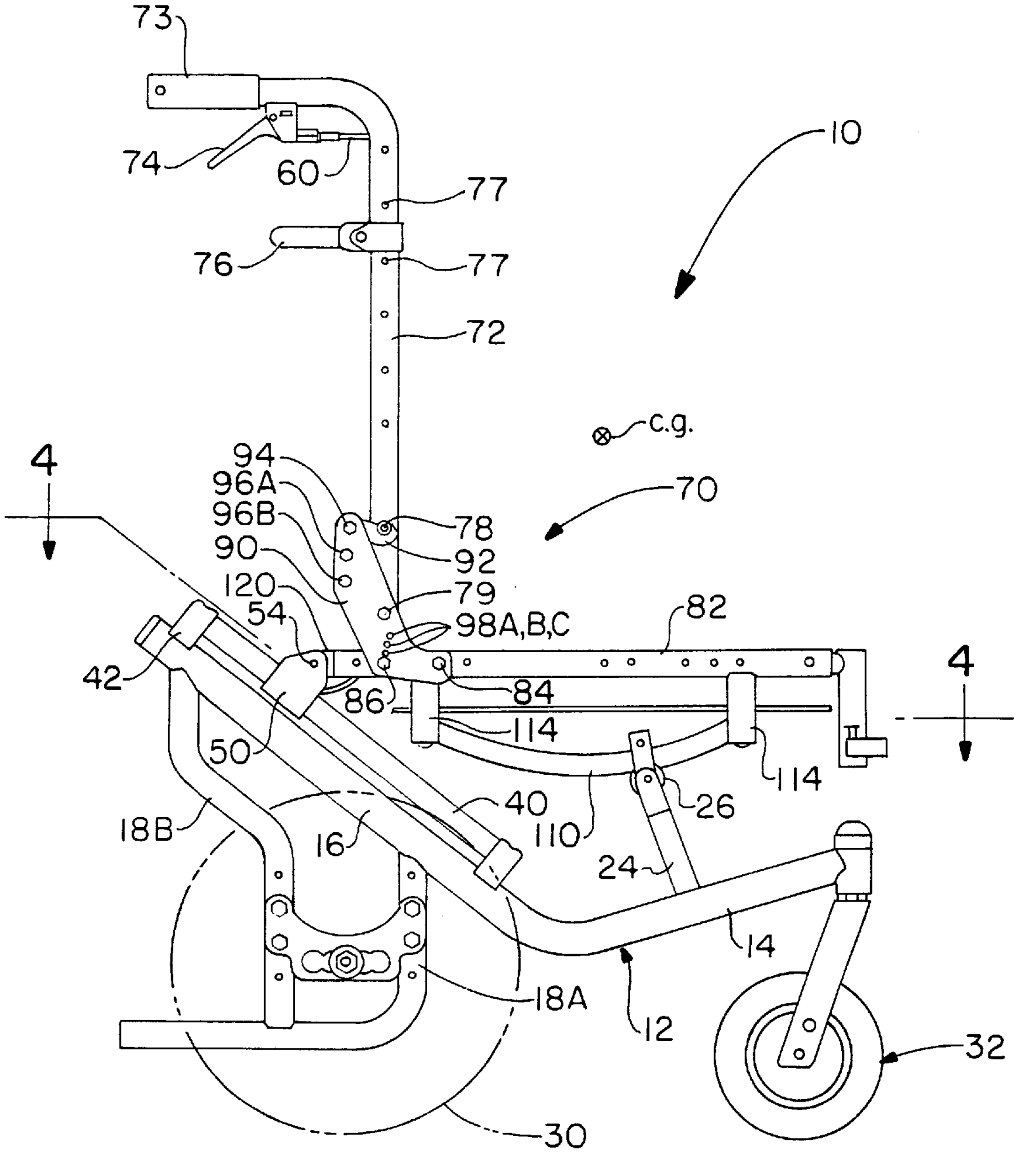
FIG. 2 is a side elevational view showing the seat in an upright position.

The utilization of spring loaded latch 92 permits seat back member 72 to be quickly disengaged from an integral connection with bottom member 82 and lowered to essentially a horizontal position when not in use. Spring latch 92 is pivotally attached to connection plate 90 through latch pivot pin 94. When wheelchair 10 is not in use, latch 92 can be pressed downwardly thereby freeing seat back pin 78 from mechanical engagement with a recess in latch 92 whereby the seat back can be lowered to reside over the seat bottom. Obviously, when the seat back is in use, it is utilized in an upward position as shown in FIG. 2. The lower portion of seat back member 72 which hinges about hinge pin 79 is prevented from moving backward by the engagement thereof with a stop block, not shown, which is secured to connection plate 90 through the utilization of stop block bolts 96A and 96B.

An important aspect of the present invention is the utilization of an archial support or curvilinear member 110 in conjunction with frame support or clevis arm 24. Archial support member 110, of course, is generally in the form of an arc of a circle. The radius of the arc, as noted above, terminates in an end point or center point which is generally located within the vicinity of the center of gravity of a hypothetical or composite person. Such a person is defined as being representative of an average of a variety of different sized and shaped people. The location of the center of gravity of the hypothetical person is about 7.5 inches forward of back members 72 and 6.5 inches above bottom members 82. A different center of gravity location will exist if archial support member 110 is tailor made for a specific person or a class of persons (e.g., small or large) since the radius of the support member will be different. The radius end point of support member 110 is generally located within 4 or 3 inches, desirably within 2 inches, and preferably within 1 inch of the center of gravity of the hypothetical or composite person or other person. During tilting of seat 70, the radius end point or center point of support member 110 will generally reside within a circle and more preferably along a horizontal line having, respectively, a diameter or length of less than about 4, 3, or 2 inches, or preferably less than about one inch from the center of gravity location. Archial support member 110 is connected to generally horizontal foot member 112 which in turn is connected to leg member 114 attached to the underside of bottom seat member 82. In order to assure lateral rigidity of the archial support members, each left and right side member is connected to each other through front cross member 116 and rear cross member 118 as shown in FIG. 4. Similarly, lateral stability of the main frame is accomplished by connecting left and right sides of main frame 12 to each other through frame front cross member 28 and frame rear cross member 29A and 29B.

Figure 3:
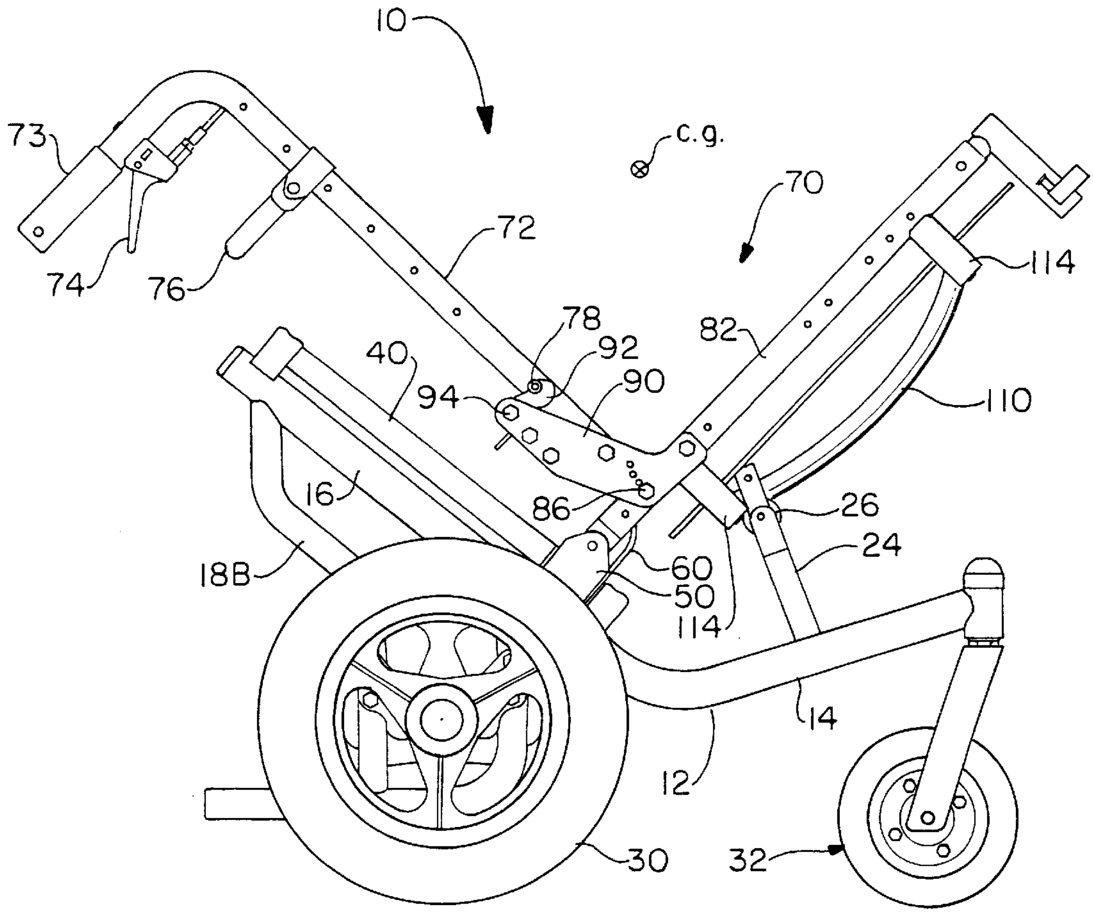
FIG. 3 is a side elevational view showing the seat in a tilted position.
Figure 5:
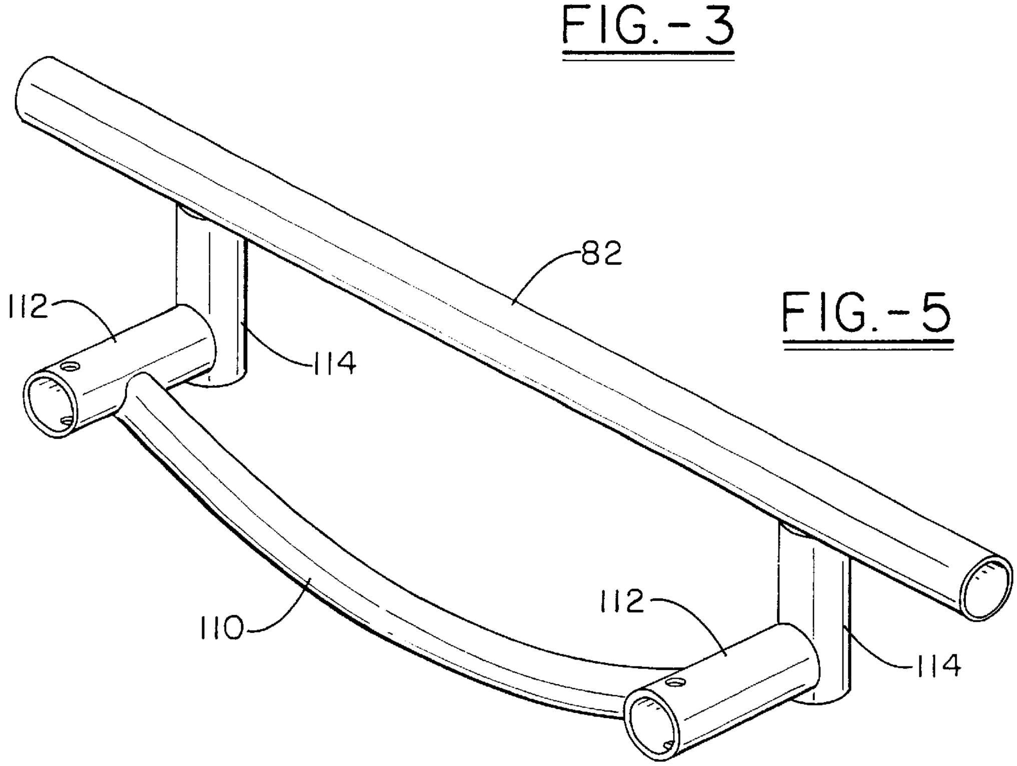
FIG. 5 is a perspective view showing the archial support member connected to a seat bottom member.
Figure 7:
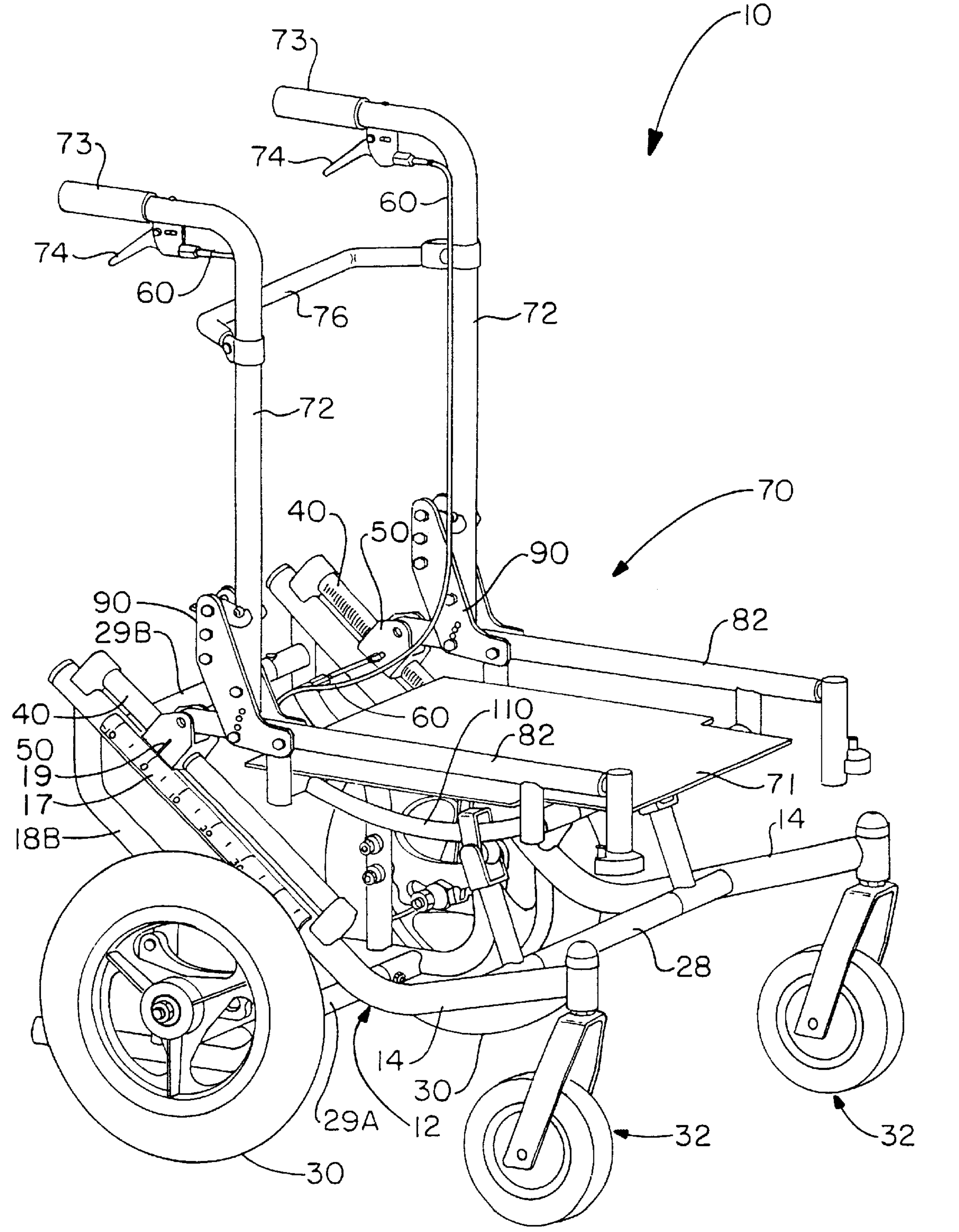
FIG. 7 is a perspective view of a wheelchair containing a tiltable seat according to the present invention, a recessed seat, and marking elements which show the tilt angle of the seat.

Recessed seat bottom member 71 is located on foot members 112 and/or front and rear cross members 116 and 118 respectively as shown at least in FIGS. 1, 2 and 3. The recessed seat is generally located from about 1-½ inches to about 3 inches, and preferably from about 2 inches to about 2-½ inches below bottom member 82. If the seat were located higher or lower, the center of gravity of an individual in the seat would often change. The recessed seat offers better stability to the user and allows one to be more comfortable and closer to frame member 14. The recessed seat also compensates for cushions, thick or thin, that can be utilized with wheelchair 10.

In lieu of the preferred archial support member 110, the same can be a curvilinear member such as a portion of a parabola, a hyperbolic, or a curve, which is not part of a circle. Regardless of the exact shape of the curvilinear member, a key aspect of the present invention is that the curvilinear member has a shape such that when seat 70 is rotated on said member over support arm 24, the center of gravity of the hypothetical or composite person, etc., seated in the wheelchair is a point, located a specific distance forward of the back member and a specific distance above the bottom member, which point is generally maintained in a fixed position or relatively small locus as the seat is tilted backward or forward. Such locus is generally an area as noted above. In other words, the curvilinear support member generally has a central region spaced apart from and located above the wheelchair frame about which the seat bottom tilts.

Extending generally from the vicinity of the junction of the back member and the bottom member such as from the rear of bottom seat member 82 is rigid link 120 which is pivotally attached to gear rack bracket 50. Gear rack 40 has an inclination which generally coincides with a straight line through or approximates an arc created by bracket pin 54 as the seat is moved from an upright position as shown in FIG. 2 to a rearward position as shown in FIG. 3. Thus, the angle of gear rack will vary depending upon the length of link 120 with the angle being more vertical for longer links (not preferred) and more longitudinal with regard to shorter link (preferred) lengths. Upon gripping pull cable release grip 74, seat 70 can be tilted as a unit rearwardly either through the use of handle 73 or transverse tilt bar 76. Generally, the seat can be tilted up to about 50 or 60 degrees. Rearward tilting of the seat causes bracket 50 to slide downwardly along gear rack 44 and at the same time cause seat bottom member 82 to move forwardly with archial support member 110 moving forward along roller 26. The combination of the inclination of rack 40 and the radius of curvature of archial support member 110 riding upon support arm 24 thus causes the center of gravity of a hypothetical or composite person, etc., seated within seat 70 to be substantially maintained as the seat bottom is moved forwardly and the back tilted rearwardly. In other words, the angle of inclination of the gear rack is such that the gear rack is parallel to the line that coincides with bracket pin 54 at both the maximum and minimum tilt of the seat when the seat is rotated about the center of gravity of a person independent of the frame 12.

Another preferred embodiment relates to a tilt and recline seat in which seat back member 72 is reclinable. In this embodiment, connection plate 90 is replaced with recliner bracket plate 130 as can be generally seen in at least FIGS. 9, 10 and 11. Seat back member 72 is hingedly or rotatably attached to recliner bracket plate 130 making seat back member reclinable. A recliner cylinder 140 at one end is operatively and fixedly attached to a rear portion of recliner bracket plate 130 and at the opposite end to seat back cylinder mounting bracket 144 through cylinder release bracket 142. Seat back cylinder mounting bracket 144 is mounted on seat back member 72. Back member 72 can have a handle 73 as seen in FIG. 1, or a stroller handle 150 such as those seen in FIGS. 8, 9 and 10. No matter what type of handle is used, pull cable release grip 74 and recliner release handle 146 are fixedly attached thereto or to seat back member 72. Preferably recliner release handle 146 is mounted under stroller handle 150 so that applying pressure on the recliner release handle lever causes recliner cable 148 to allow recliner cylinder 140 to be released thereby allowing the seat back member to be reclined from a range of about 90 degrees to about 180 degrees in relation to seat bottom member 82. Pull cable release grip 74 is preferably mounted on the inside of stroller handle 150 so that upon applying pressure thereto the wheelchair can be tilted as described herein above.

Although recliner cable 148 can run from recliner release handle 146 to cylinder release bracket 142 on the same side of the wheelchair, it is preferred that recliner cable 148 is attached to a recliner release handle and cylinder release bracket on opposite side of the wheelchair to prevent kinking or binding of recliner cable 148.

Generally two recliner cylinders 140 are utilized, but any number will suffice. The cylinders are preferably gas-locking cylinders, but oil or other fluid type cylinders can also be used. The gas pressure counteracts the weight of the person in the chair and thus aids an attendant raising the seat back member.

Figure 8:
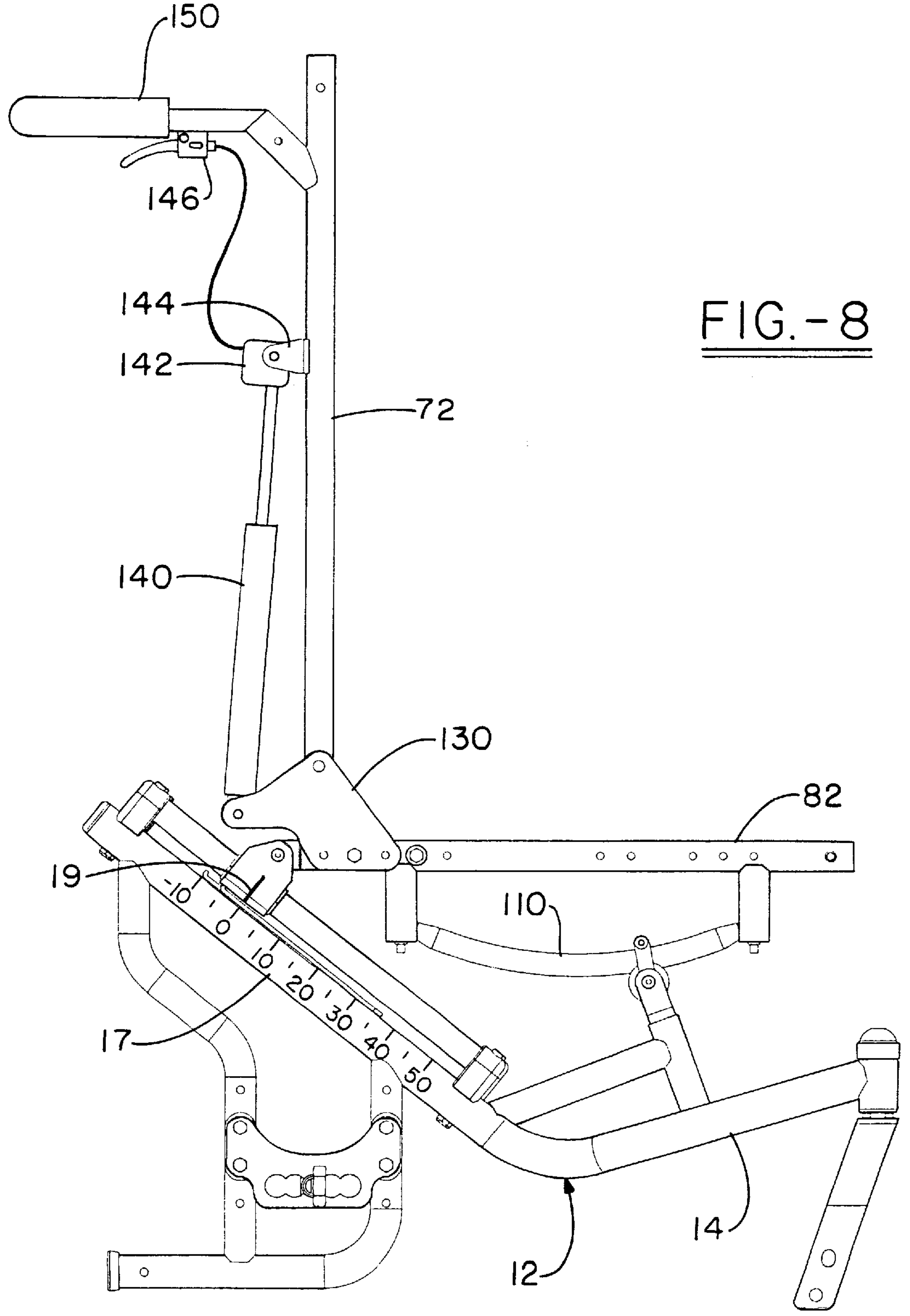
FIG. 8 is a side elevational view of a wheelchair having a reclinable back member as well as a tiltable seat. The seat is shown at 0 degrees tilt and 90 degrees recline.
Figure 9:
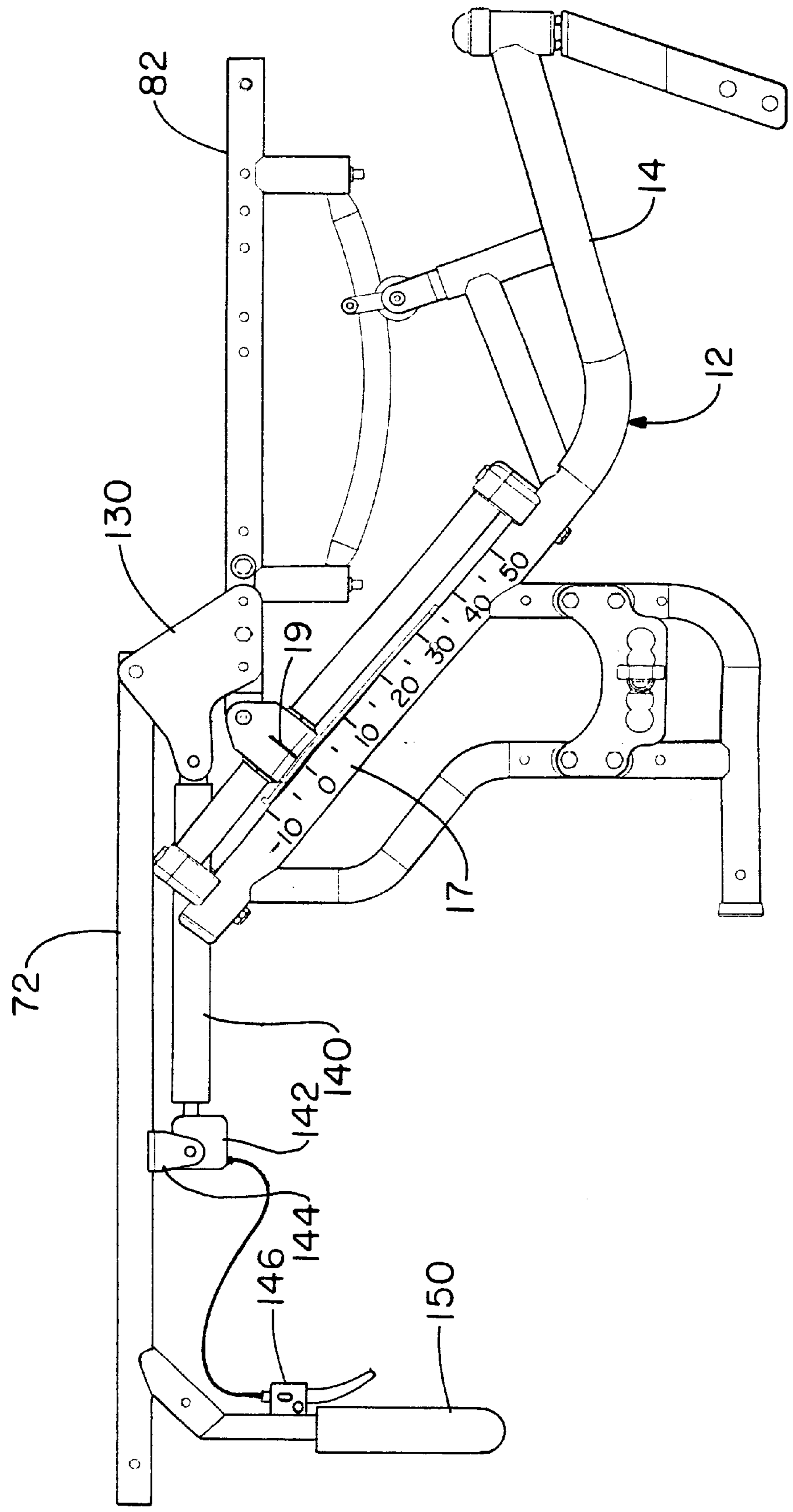
FIG. 9 is a side elevational view showing the seat tilted 0 degrees and 180 degrees recline.
Figure 10:
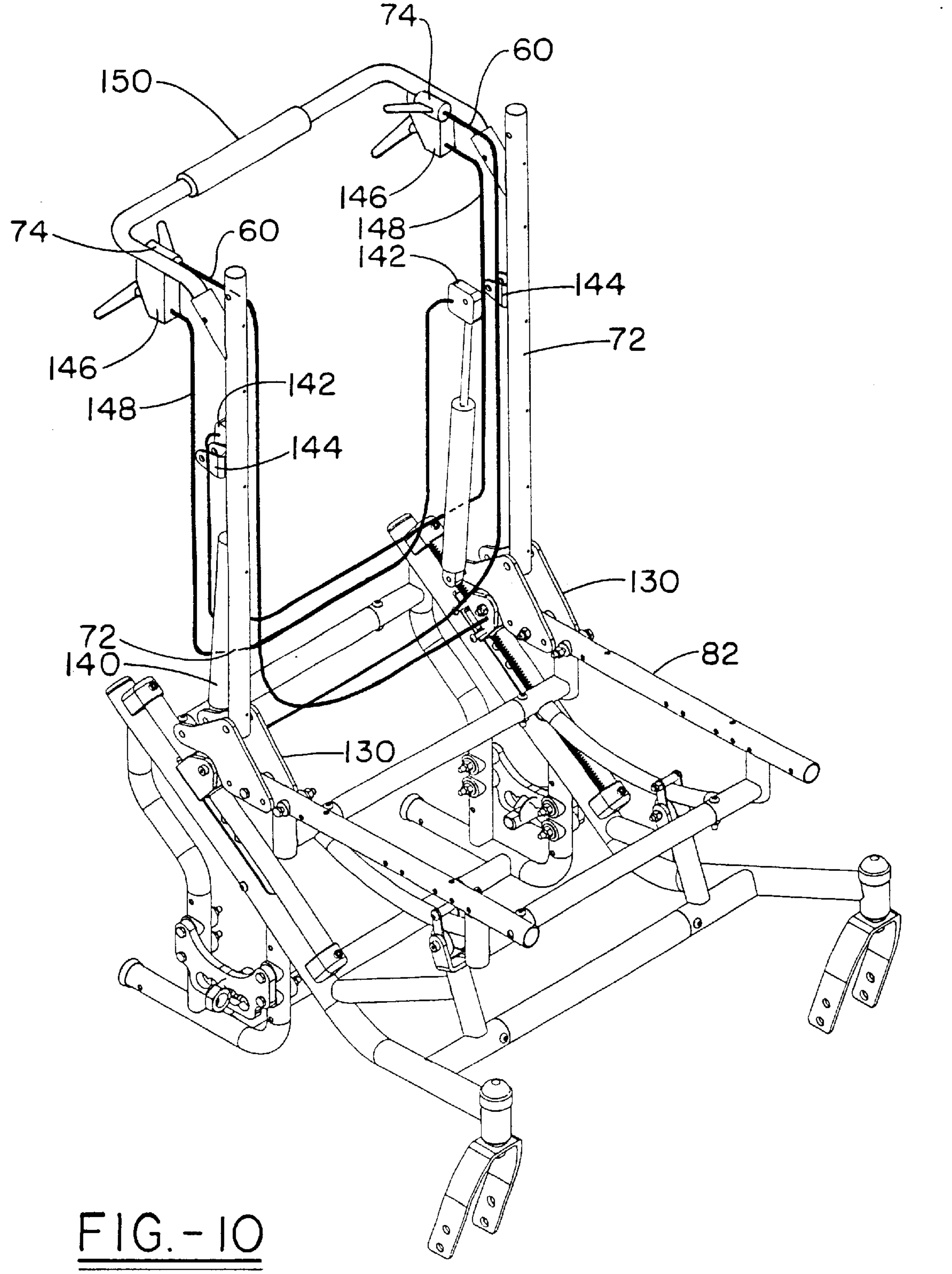
FIG. 10 is a perspective view of the tiltable and reclinable wheelchair showing a recliner bracket plate, recliner cylinders, recliner release handles, and a pull cable release grip.

The following table is only an example of the possible recline angle ranges at various degrees of tilt for a specific wheelchair geometry as shown in FIGS. 8, 9, and 10. It is foreseeable that wheelchairs with other dimensions could be made to tilt and recline at other angles and ranges.

| TILT ANGLE (relative to the floor) | MINIMUM RECLINE ANGLE (relative to the seat) | MAXIMUM RECLINE ANGLE (relative to the seat) |
|---|---|---|
| −10 deg (forward) | 90 deg | 180 deg |
| −5 deg (forward) | 90 deg | 180 deg |
| 0 deg | 90 deg | 180 deg |
| 5 deg | 90 deg | 168 deg |
| 10 deg | 90 deg | 158 deg |
| 15 deg | 90 deg | 149 deg |
| 20 deg | 90 deg | 141 deg |
| 25 deg | 90 deg | 134 deg |
| 30 deg | 90 deg | 126 deg |
| 35 deg | 90 deg | 119 deg |
| 40 deg | 90 deg | 112 deg |
| 45 deg | 90 deg | 106 deg |

It is noted that as the tilt angle increases, the maximum possible recline angle is reduced due to chair geometry.

From the above description, it should be understood that the wheelchair seat embodiments of FIGS. 8, 9 and 10 of the present invention are both tiltable and reclinable.

Although the constant center of gravity tilt seat of the present invention has been described in association with a preferred embodiment having a manual tilt, as well as with a manual tilt and manual recline seat back, it can use a power tilt and also a power recline seat back. The tilt seat, as well as the tilt and recline seatback seat, can also be utilized with any wheelchair base including power wheelchairs, i.e., powered by one or more batteries, as well as with different types of wheel drives, for example, a front-wheel drive, a mid-wheel drive, or a rear-wheel drive. All that is required is seat 70 and related structural components such as archial support member 110 and gear rack 40 be attached to the frame work of such vehicles in a manner as shown and described herein. Moreover, with regard to manual wheelchairs such as that shown in the drawings, different wheel sizes and locations can be utilized such as where the front wheels have a large diameter and the rear wheels have a smaller diameter.

While in accordance with the patent statutes the best mode and preferred embodiment have been set forth, the scope of the invention is not limited thereto, but rather by the scope of the attached claims.

What is claimed is:

1. A wheelchair, comprising:

a frame supposed by a plurality of wheels, said frame including an inclined portion;

a tiltable seat, said seat having a back member and bottom member, said seat operatively connected to said inclined frame portion for controlling the tilting of said seat;

an archial support member connected to said seat bottom and operatively and movably engaging said frame, said archial support member having a center region which when said seat is tilted backward and forward said seat tilts about said center region;

marking elements on said inclined frame portion which substantially correspond to a range of degrees of tilt said seat bottom can be tilted; and a marking point operably connected to said seat, said marking point indicating the degree of tilt of said seat bottom.

2. A wheelchair according to claim 1, including an inclined gear rack fixedly connected to said inclined portion of said frame, said gear rack having a bracket slideable thereon, said bracket operatively connected to the rear portion of said seat said bracket causing said seat to tilt backward or forward as said bracket is respectively slid downward or upward along said gear rack, and wherein said gear rack bracket has said marking point thereon to indicate the degree of tilt of said seat.

3. A wheelchair according to claim 2, wherein said frame has a support arm and said archial support member movably engages said support arm, wherein said seat is manually tiltable, wherein said slideable bracket has a cable connected thereto, and wherein said cable is capable of causing said slideable bracket to engage or disengage said gear rack and allow adjustment to different angles of tilt.

4. A wheelchair according to claim 3, wherein said gear rack contains a plurality of releasable engagement positions engagable by said slidable bracket to maintain said seat in a desired tilt position, and wherein said seat back member is reclinable.

5. A wheelchair according to claim 4, including a recliner bracket plate, said recliner bracket plate being hingedly attached to said seat back member and fixedly attached to said seat bottom member so that said seat back member can be reclined from a range of about 90 degrees to about 180 degrees in relation to said seat bottom member.

6. A wheelchair according to claim 2, wherein said wheelchair is a manual wheelchair.

7. A wheelchair according to claim 2, wherein said seat has a recessed seat bottom member, and wherein said recessed seat bottom member is recessed below said seat.

8. A wheelchair comprising;

a frame supported by a plurality of wheels, said frame having an inclined portion;

a tiltable seat operatively connected to said frame, said seat having a seat back member connected to a seat bottom member, said seat operatively connected to said inclined frame portion for controlling the tilting of said seat, said seat bottom having a curvilinear support member operatively and movably engaging said frame, said curvilinear support member generally having a center region spaced apart from and located above said wheelchair frame about which said seat bottom tilts.

9. A wheelchair according to claim 8, including a gear rack connected to said inclined frame portion and operatively connected to said seat, a bracket slidable on said gear rack, said bracket causing said seat to tilt rearward or forward as said bracket is moved respectively in a first direction or in a second direction along said gear rack so that said seat bottom substantially tilts about sad center region, and also including a recliner bracket plate which hingedly attaches said recliner seat back member to said seat bottom member so that said seat back member can be reclined from an angle of about 90 degrees to about 180 degrees in relation to said seat bottom member.

10. A wheelchair according to claim 8, wherein said frame has a support arm and said curvilinear support member movably engages said support arm.

11. A wheelchair according to claim 9, wherein said seat is manually tiltable, wherein said slidable gear rack bracket has a cable connected thereto, wherein said cable is capable of causing said slidable gear rack bracket to engage or disengage said gear rack at different angles of seat bottom tilt, wherein said seat back member is manually reclinable, wherein a recliner cylinder is operatively attached to said recliner bracket plate and said seat back member, wherein said recliner cylinder has a cable connected thereto, and wherein said cable is attached to a recliner release handle which is capable of causing said recliner cylinder to look or unlock so that the recline angle of said seat back can be changed.

12. A wheelchair according to claim 11, including two recliner cylinders operatively connecting said recliner bracket plate to said seat back member, one of said cylinders being in compression and the other being in tension.

13. A wheelchair according to claim 8, wherein said wheelchair is a manual wheelchair.

14. A wheelchair according to claim 8, wherein said seat bottom is recessed below said seat.

15. A wheelchair according to claim 9, wherein said inclined frame portion has marking elements thereon which substantially correspond to a range of degrees of tilt said seat bottom can be tilted, and wherein said bracket includes a marking point for indicating the degree of tilt of said seat bottom.

16. A wheelchair open to the front for seating a person, comprising:

a tiltable seat assembly having a back and a bottom which form an angle there between;

a frame supported by a plurality of wheels, said frame including an inclined portion;

a curved seat member which supports said seat assembly and which operatively and movably engages said frame, said curved seat member generally having a center region spaced apart and located above said wheelchair frame; and said inclined frame portion operatively controlling the tilting of said seat and further supporting a rear mount member which is pivotally connected to said seat so that said curved seat member and said inclined frame portion are capable of tilting said seat about said center region.

17. A wheelchair according to claim 16, wherein said frame includes a support arm and wherein said curved member is capable of movably engaging said support arm.

18. A wheelchair according to claim 16, wherein said mount member can be locked in position relative to said inclined member.

19. A wheelchair according to claim 18, wherein said curved member defines an arc.

20. A wheelchair, comprising:

a wheelchair frame, said frame including an inclined portion, said frame supported by a plurality of wheels;

a seat having a bottom member and a back member;

an archial support member operatively connected to said seat bottom member and movably and operatively connected to said frame; and said inclined frame portion operatively connected to said seat so that in conjunction with said archial support member said seat can be adjusted to various degrees of tilt.

21. A wheelchair according to claim 20, wherein said archial support member generally has a central region spaced apart from and located above said wheel chair frame about which said seat tilts.

22. A wheelchair according to claim 21, wherein said wheelchair frame has a support arm and wherein said archial support member is movably and operatively connected to said support arm.

23. A wheelchair according to claim 22, wherein said inclined member is said separate member.

* * * * *